(12) United States Patent
Morin et al.

(10) Patent No.: US 10,561,268 B2
(45) Date of Patent: Feb. 18, 2020

(54) COFFEE MACHINE COMPRISING A DEVICE FOR TRANSFERRING COFFEE GROUNDS

(71) Applicant: SEB S.A., Ecully (FR)

(72) Inventors: Gilles Morin, Varois et Chaignot (FR); Fabien Russier, Dijon (FR)

(73) Assignee: SEB S.A., Ecully (FR)

(*) Notice: Subject to any disclaimer, the term of this patent is extended or adjusted under 35 U.S.C. 154(b) by 0 days.

(21) Appl. No.: 16/306,011

(22) PCT Filed: May 30, 2017

(86) PCT No.: PCT/FR2017/051349
§ 371 (c)(1),
(2) Date: Nov. 30, 2018

(87) PCT Pub. No.: WO2017/207918
PCT Pub. Date: Dec. 7, 2017

(65) Prior Publication Data
US 2019/0183282 A1 Jun. 20, 2019

(30) Foreign Application Priority Data
Jun. 2, 2016 (FR) ...................................... 16 55050

(51) Int. Cl.
*A47J 31/40* (2006.01)
*A47J 31/10* (2006.01)

(52) U.S. Cl.
CPC .............. *A47J 31/404* (2013.01); *A47J 31/10* (2013.01); *A47J 31/401* (2013.01); *A47J 31/40* (2013.01)

(58) Field of Classification Search
CPC ......... A47J 31/404; A47J 31/401; A47J 31/40
(Continued)

(56) References Cited

U.S. PATENT DOCUMENTS 2,956,711 A * 10/1960 Mortara ................ A47J 31/404
222/170
3,305,139 A 2/1967 Ward
(Continued)

FOREIGN PATENT DOCUMENTS

EP 1 654 968 A1 5/2006
EP 1 854 387 A2 11/2007
(Continued)

OTHER PUBLICATIONS

International Search Report as issued in International Patent Application No. PCT/FR2017/051349, dated Sep. 4, 2017.
(Continued)

*Primary Examiner* — Reginald Alexander
(74) *Attorney, Agent, or Firm* — Pillsbury Winthrop Shaw Pittman LLP

(57) ABSTRACT

A coffee machine includes an infusion zone, a storage container for ground coffee arranged above the infusion zone, and a device for transferring the coffee grounds from the storage container to the infusion zone via an aperture. The transfer device includes a member for opening and closing the aperture, which can move between an open position and a closed position. The aperture opening and closing member includes an open portion that has an inclined wall configured, when in the open position, to be positioned beneath the aperture and to direct the coffee grounds that pass through said aperture towards the infusion zone, and configured to be offset from the aperture when in the closed position. The transfer device also includes a cleaning member for the inclined wall when moving from the open position into the closed position and vice versa.

20 Claims, 4 Drawing Sheets

(58) Field of Classification Search
USPC .................. 99/289 R; 222/342, 345, 409
See application file for complete search history.

(56) References Cited

U.S. PATENT DOCUMENTS

| | | | | |
|---|---|---|---|---|
| 4,537,333 A | * | 8/1985 | Bjerregaard | G01F 11/24 222/345 |
| 4,629,093 A | * | 12/1986 | Le Molaire | F42B 33/0292 141/129 |
| 2016/0109273 A1 | * | 4/2016 | LaFosse | A47J 31/404 222/71 |

FOREIGN PATENT DOCUMENTS

| | | | | |
|---|---|---|---|---|
| WO | WO-8101097 A1 | * | 4/1981 | ............ A47J 31/402 |
| WO | WO 89/12416 A2 | | 12/1989 | |
| WO | WO 2004/112554 A1 | | 12/2004 | |

OTHER PUBLICATIONS

Written Opinion of the International Searching Authority as issued in International Patent Application No. PCT/FR2017/051349, dated Sep. 4, 2017.

* cited by examiner

COFFEE MACHINE COMPRISING A DEVICE FOR TRANSFERRING COFFEE GROUNDS

CROSS-REFERENCE TO RELATED APPLICATIONS

This application is the U.S. National Stage of International Application Serial No. PCT/FR2017/051349, filed May 30, 2017, which in turn claims priority to French Application No. 1655050, filed Jun. 2, 2016. The contents of all of these applications are incorporated herein by reference in their entirety.

This invention concerns a coffee machine which is equipped with a ground coffee storage reservoir, a filter holder constituting a brewing area and a device for transferring ground coffee from the reservoir towards the filter holder, and in which hot water can be poured into the filter holder containing the ground coffee in order to prepare the coffee beverage.

The invention particularly concerns the device provided on the coffee machine for transferring the ground coffee.

STATE OF THE ART

Coffee machines have been in existence for many years and are very well known to the person skilled in the art.

A coffee machine traditionally comprises a filter holder for receiving a filter and in which the ground coffee is placed when the coffee beverage is being prepared. The coffee machine comprises a water tank and a hot water dispensing system configured to draw water from the tank, to heat this water and then to pour the hot water into the filter holder containing the ground coffee. The hot water poured onto the ground coffee allows it to brew, the mixture then being filtered to extract from it the coffee beverage, the coffee grounds remaining contained in the used filter.

Certain coffee machines are equipped with a ground coffee storage reservoir and a device for transferring the ground coffee from the storage reservoir towards the filter holder. This type of coffee machine has the advantage of avoiding storage of the opened package of ground coffee in a storage area, requiring said package to be removed each time the filter holder must be filled to prepare a coffee beverage. For example, the patent applications published under the numbers WO8912416A2, WO2004112554A1, EP1654968A1 and EP1854387A2 disclose such coffee machines which comprise a filter holder constituting a brewing area, a ground coffee storage reservoir arranged over the brewing area and a device for transferring ground coffee from the storage reservoir towards the brewing area.

According to the document WO8912416A2, the transfer device includes a piston-type part, driven in a reciprocating motion and driven manually, the said part allowing a quantity of ground coffee to be transferred through a dispensing aperture.

According to the document WO2004112554A1, the coffee machine has a motor which drives a blade ensuring the transfer of ground coffee from the storage reservoir towards the brewing area, through a dispensing aperture. The storage reservoir has a part for opening and closing the dispensing aperture, the said part being manually movable.

According to the document EP1654968A1, the coffee machine comprises a pressure piston allowing compaction of the ground coffee in the brewing area, and actuation means allowing the pressure piston to slide relative to the brewing area, from a resting position in which the piston is outside the brewing area to a working position inside the brewing area. The coffee machine comprises a ground coffee storage reservoir which has a dispensing aperture communicating with a trough able to channel the said product towards the brewing area. This trough is brought into contact with a cleaning device which is driven by the pressure piston or by the brewing area over at least a portion of their course. The cleaning device comprises a scraper which cleans the trough automatically. This cleaning prevents fouling of the trough due to moisture, in particular during a series of coffee-preparation cycles.

According to the document EP1854387A2, the coffee machine comprises a brewing area and a ground coffee storage reservoir which has a dispensing aperture communicating with a trough able to channel the ground coffee towards the brewing area. The coffee machine also comprises a device for automatic cleaning of the trough. This automatic cleaning device comprises a wiping arm provided inside the trough and actuated by an electrical drive mechanism.

These ground coffee transfer devices, described in the aforementioned documents, have the advantage of preventing moisture from rising towards the ground coffee storage reservoir.

SUMMARY OF THE INVENTION

The objective of this invention is to implement a coffee machine in which the device for transferring ground coffee from the ground coffee storage reservoir towards the brewing area has a simple design, prevents moisture from rising towards the ground coffee storage reservoir, and has no risk of fouling.

For this purpose, the coffee machine according to the invention has a brewing area constituting in particular a filter holder, a ground coffee storage reservoir arranged above the brewing area and a device for transferring ground coffee from the storage reservoir towards the brewing area through a dispensing aperture. The transfer device comprises a member for opening and closing the aperture, this member being able to move between an open position and a closed position.

In addition, the aperture opening and closing member comprises an open part which has an inclined wall. The inclined wall is configured, when in the open position, to be positioned below the aperture and to direct towards the brewing area the ground coffee that passes through this aperture, and to be offset from the aperture when in the closed position.

In addition, the transfer device comprises a member for cleaning the said inclined wall when it moves from the open position to the closed position, and vice versa.

In this way, moving the member into the open position ensures that the inclined wall is positioned below the aperture, which releases this aperture and allows the ground coffee to be transferred from the storage reservoir towards the brewing area, the slope of this inclined wall guiding the ground coffee towards the said brewing area. Conversely, moving the member into the closed position instantaneously closes this aperture.

Cleaning the inclined part each time the member is moved in one direction or the other prevents it from becoming fouled, which guarantees an appropriate metering of the ground coffee each time it is transferred to the brewing area.

According to a preferred design of the coffee machine, the inclined wall is configured to direct the ground coffee towards the center of the brewing area. This guarantees that the ground coffee is appropriately positioned in the brewing area, so that the entirety of this ground coffee is brewed when the hot water is poured into the said brewing area. This configuration further allows the storage reservoir to be arranged directly over the brewing area, in the same axis, which reduces the dimensions of the coffee machine. One could envision variants with an inclined wall directing the ground coffee to the side of the brewing area, or even with a storage reservoir offset from the filter holder and an inclined wall consequently arranged to guide the ground coffee into the filter holder during its transfer.

Advantageously, the cleaning member comprises a vertical wall cooperating with the inclined wall to clean it when the opening and closing member moves from the open position to the closed position, and vice versa.

Preferably, the transfer device comprises means for translational movement of the aperture opening and closing member from the open position to the closed position, and vice versa.

Advantageously, the aperture opening and closing member comprises a horizontal wall which blocks the aperture in the closed position. Preferably this horizontal wall forms a single piece with the open part comprising the inclined wall.

Advantageously, the ground coffee transfer device comprises an operating lever for the aperture opening and closing member. Preferably, the operating lever is able to move between a vertical position, in which the aperture opening and closing member is in a closed position, and a horizontal position, in which the aperture opening and closing member is in an open position. Preferably, the ground coffee transfer device comprises a rack and pinion system, the lever being secured to the pinion and the rack being secured to the aperture opening and closing member.

Advantageously, the ground coffee transfer device comprises a spring to return the aperture opening and closing member from the open position to the closed position. This allows the said member to return instantly to the original position when any action on the latter is stopped.

Preferably, the ground coffee transfer device comprises a disk driven in rotation by a motor. In addition, the start-up of the motor is controlled by moving the aperture opening and closing member into the open position. This allows instantaneous transfer of the ground coffee from the storage reservoir towards the brewing area once the aperture is open. Preferably, the disk is driven in rotation about a vertical axis and the motor is arranged at the center of the disk with respect to this vertical axis.

BRIEF DESCRIPTION OF THE FIGURES

The characteristics and advantages of the coffee machine according to the invention will be seen by reading the following description of a preferred and non-restrictive embodiment, relying on figures among which.

DETAILED DESCRIPTION

Figure 1:
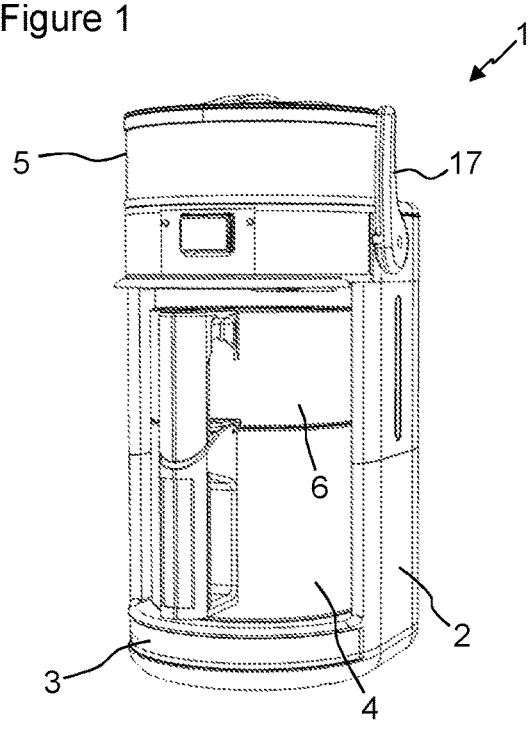
FIGS. 1 and 2 illustrate the coffee machine in two positions corresponding, respectively, to the closure of the aperture between the storage reservoir and the brewing area, and to the opening of the aperture for transferring the ground coffee from the storage reservoir towards the brewing area.
Figure 2:
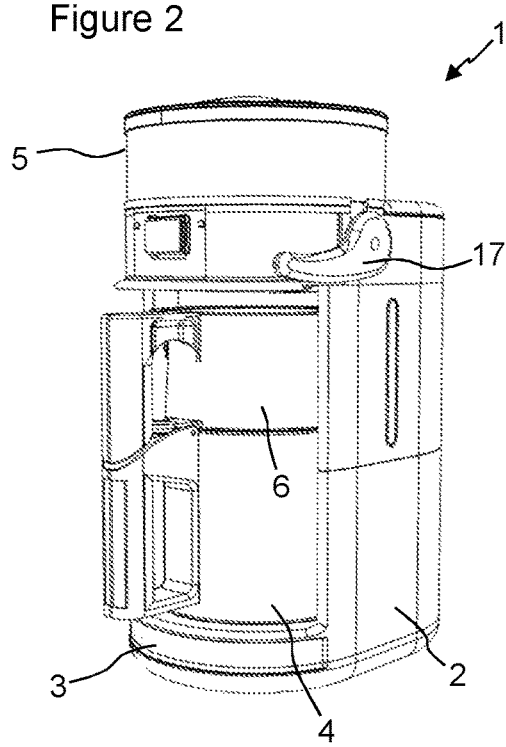
Figure 3:
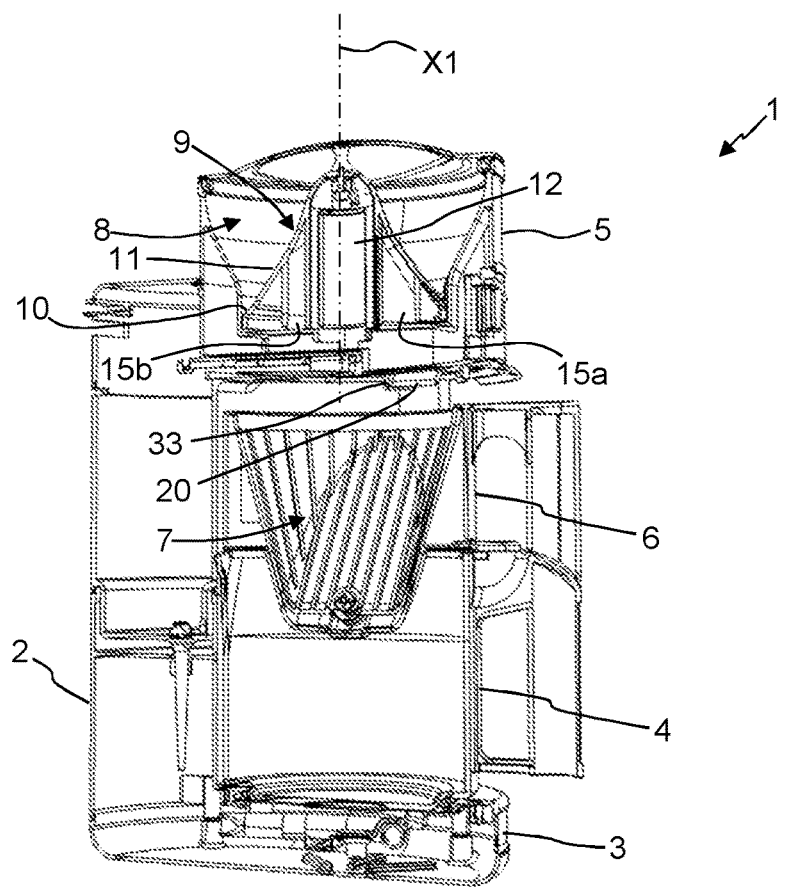
FIG. 3 illustrates the coffee machine in cross section in order to highlight some of its components.
Figure 4:
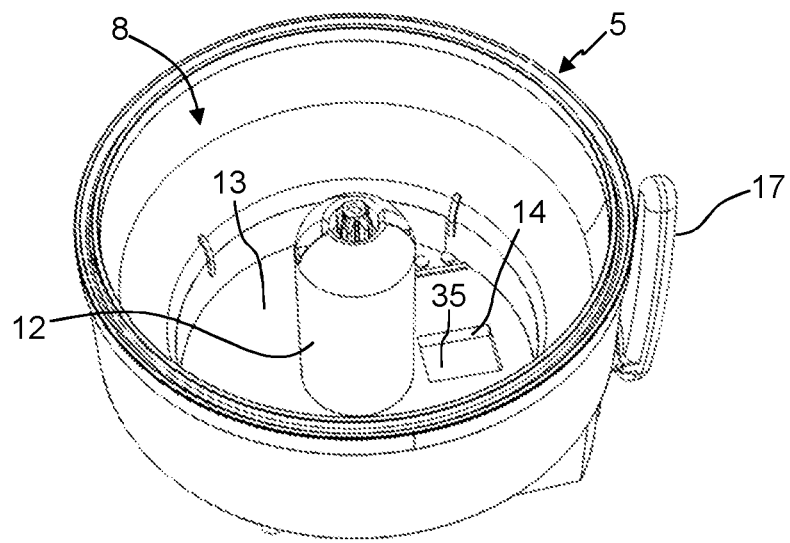
FIGS. 4 and 5 illustrate a top view and a bottom view, respectively, of the storage reservoir with the member for opening and closing the aperture in the closed position.

FIGS. 1 to 3 show the coffee machine 1 according to the invention, in a preferred design mode. The term "machine 1" is used in the rest of the description to define the said coffee machine 1.

The machine 1 traditionally comprises a body 2 provided with a heating base 3 configured to receive a pot 4 into which the coffee beverage (not illustrated) is discharged. The machine 1 comprises a storage reservoir 5 arranged above a filter holder 6 which defines a brewing area 7.

The storage reservoir 5 defines a volume 8 allowing a certain quantity of ground coffee to be received, for example the equivalent of a 250-gram package of ground coffee, which is generally commercially available. This storage reservoir 5 integrates a turbine 9 which comprises a disk 10 in its base, the said disk 10 being extended towards the top by a more or less bell-shaped body 11. This turbine 9 is driven in rotation about a first vertical axis X1 by means of a motor 12 arranged with respect to this axis X1 inside the body 11, as illustrated in FIG. 3. In FIGS. 1 to 3 it is observed that the storage reservoir 5 is arranged in the same vertical axis as the filter holder 6 and as the pot 4, in this instance the axis X1.

The storage reservoir 5 comprises a bottom 13 provided with an aperture 14 allowing the ground coffee to pass from the said storage reservoir 5 towards the brewing area 7 of the filter holder 6. The disk 10 is positioned above the bottom 13 and above the aperture 14. The disk 10 comprises blades 15a, 15b allowing the ground coffee to be carried towards the aperture 14 during the rotation of the said disk 10, so as to transfer the ground coffee from the storage reservoir 5 towards the filter holder 6 when this aperture 14 is released, as is explained below in the description.

The machine 1 comprises a member 16 for opening and closing the aperture 14. The opening and closing member 16 is actuated by means of an operating lever 17 acting on translation means 18, as illustrated in more detail in FIGS. 4 to 9.

Figure 8:
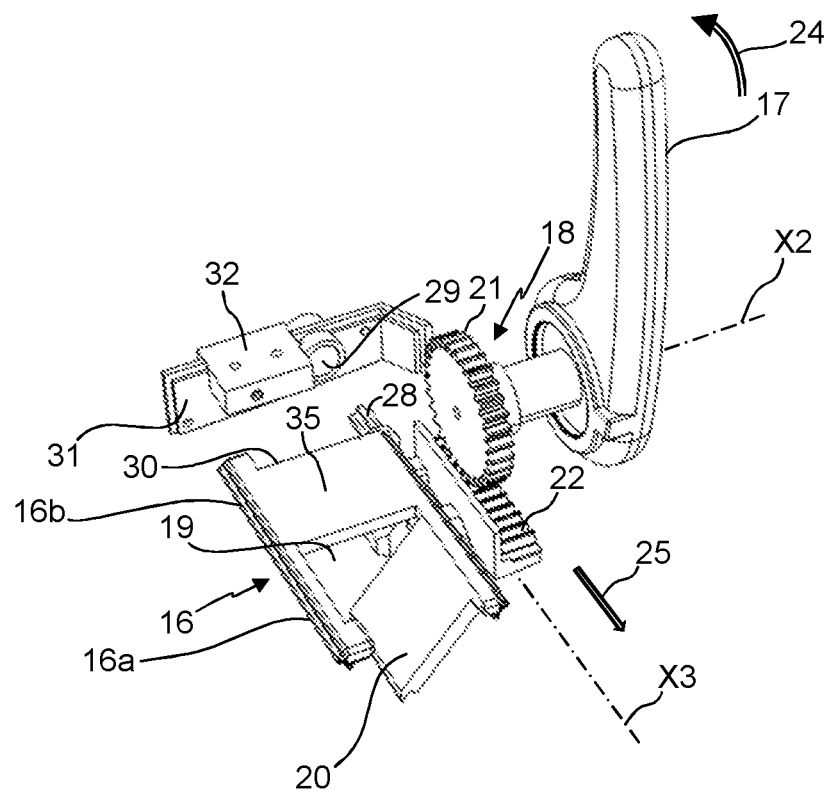
FIGS. 8 and 9 illustrate the member for opening and closing the aperture with a control lever for this member, in the closed position and in the open position, respectively.
Figure 9:
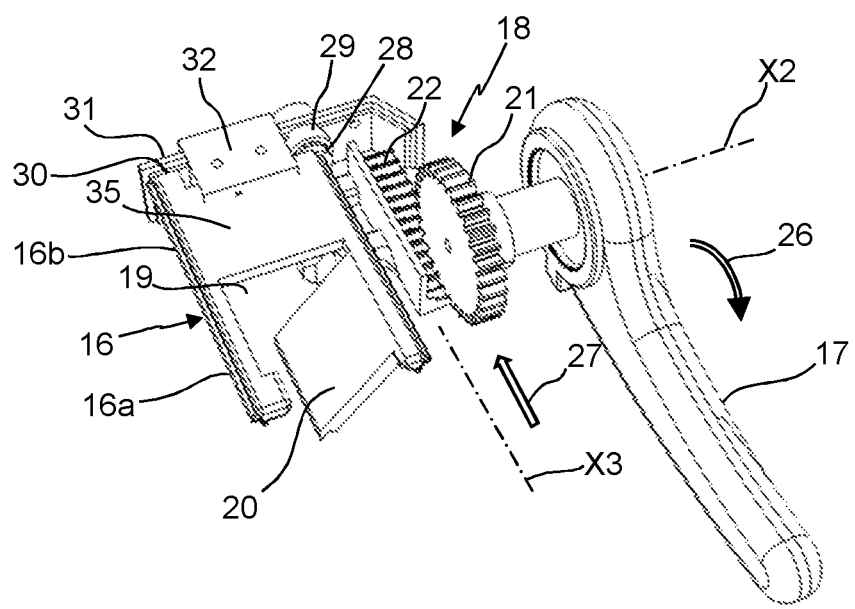

The opening and closing member 16 comprises a first part 16a defining an opening 19 and an inclined wall 20 extending below this opening 19, as illustrated in particular in FIGS. 8 and 9. This opening and closing member 16 also comprises a second part 16b provided as an extension of the first part 16a and defining a horizontal wall 35.

The translation means 18 comprise a rack 22 and pinion 21 system. The operating lever 17 is pivotably mounted according to a second horizontal axis X2, with respect to the wall 23 of the storage reservoir 5, as illustrated in particular in FIGS. 5 and 7. The pinion 21 is secured to the operating lever 17 and turns about this axis X2 during actuation of the said operating lever 17. This pinion 21 meshes with the rack 22, the rotation of the pinion 21 in one direction or the other resulting in the translational movement of the rack in one direction or the other, respectively, about a third horizontal axis X3 illustrated in FIGS. 8 and 9. The opening and closing member 16 is slidably engaged with respect to the bottom 13 of the storage reservoir 5, according to this third axis X3. This opening and closing member 16 is secured to the rack 22. Thus, as illustrated in FIG. 8, the actuation in rotation of the operating lever 17 in the direction of the first arrow 24 about the second axis X2, results in a translational movement of the opening and closing member 16 in the direction of the second arrow 25 about the third axis X3. Conversely, as illustrated in FIG. 9, the actuation in rotation of the operating lever 17 in the direction of the third arrow 26 about the second axis X2, results in a translational movement of the opening and closing member 16 in the direction of the fourth arrow 27 about the third axis X3.

When the operating lever 17 is in the upward vertical position, as illustrated in FIGS. 1, 4, 5 and 8, the horizontal wall 35 closes the aperture 14. Conversely, when the operating lever 17 is in the frontward horizontal position, as illustrated in FIGS. 2, 6, 7 and 9, the opening 19 and the inclined wall 20 are positioned below the aperture 14, which releases this aperture 14 and allows the ground coffee to be transferred from the storage reservoir 5 towards the filter holder 6.

Figure 7:
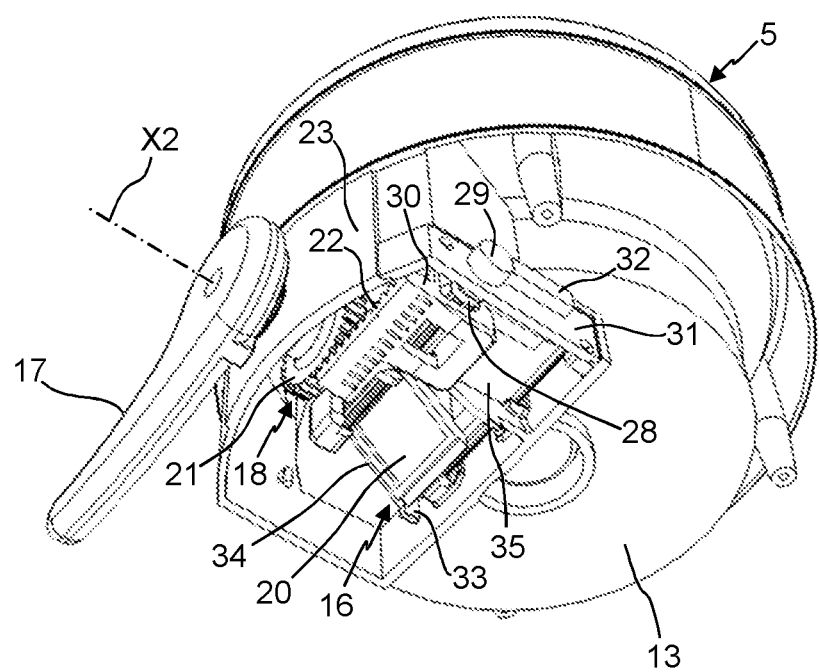

A spring (not illustrated) is mounted between a stud 28 which is mounted on a first extremity of the spring and a housing 29 which receives a second extremity of the spring. The stud 28 is arranged at the rear extremity 30 of the opening and closing member 16 and the housing 29 is arranged on an edge 31 of the storage reservoir 5, as illustrated in FIGS. 5, 7, 8 and 9. When the rear extremity 30 of the opening and closing member 16 is bearing against the edge 31, in the opening position corresponding to the actuation of the operating lever towards its frontward horizontal position, as illustrated in FIGS. 7 and 9 in particular, the spring is compressed between the stud 28 and the housing 29. When the operating lever 17 is released, the spring releases and ensures that the opening and closing member 16 returns to the closed position, the member then moving in the direction of the second arrow 25, which makes the said operating lever 17 pivot in the direction of the first arrow 24 and brings it to the upward vertical position, illustrated in particular in FIGS. 5 and 8. The machine 1 comprises a sensor 32 arranged on the edge 31, for example a switch, which is activated when the rear extremity 30 of the opening and closing member 16 bears against the edge 31, that is, in the open position in which the opening 19 and the inclined wall 20 are arranged below the aperture 14. The activation of the sensor 32 results in the start-up of the motor 12 and the rotation of the turbine 9, which pushes the ground coffee through the aperture 14 and the opening 19, the said ground coffee then being guided by the slope of the inclined wall 20 during its fall into the filter holder 6. The inclined wall 20 is oriented to guide the ground coffee towards the center of the filter holder 6, as illustrated in particular in FIG. 3.

Figure 5:
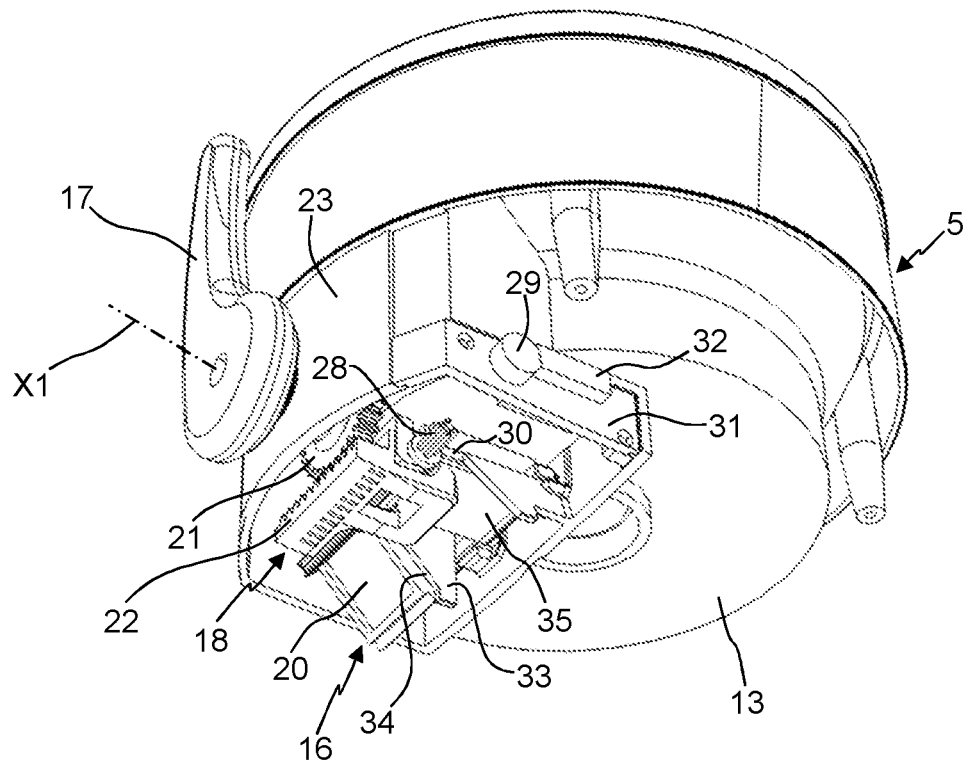
Figure 6:
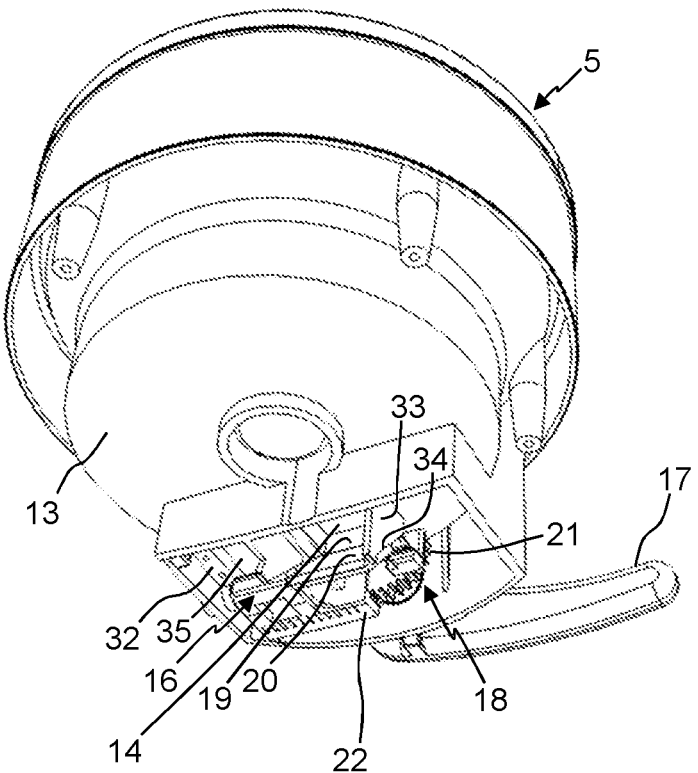
FIGS. 6 and 7 illustrate from two different angles a bottom view of the storage reservoir with the member for opening and closing the aperture in the open position.

The storage reservoir 5 comprises below its bottom 13 a cleaning member in the form of a vertical wall 33 provided with an inclined panel 34 having a slope identical to that of the inclined wall 20, as illustrated in FIGS. 5 and 6. The inclined panel 34 is adjacent to the inclined wall 20, so as to scrape the said inclined wall 20 when the opening and closing member 16 moves from the open position to the closed position, and vice versa. Regular cleaning of the inclined wall 20 prevents the accumulation of ground coffee on the latter, caused in particular by the moisture present due to steam and condensation. This allows precisely metering the ground coffee falling into the filter holder 6, each time the operating lever 17 is activated.

The preceding description of a preferred embodiment is not restrictive. This preferred implementation of the machine 1 advantageously simplifies the design and its manufacturing cost.

However, numerous variants may be considered, in particular as to the position of the storage reservoir 5 and of its aperture 14, above the filter holder 6. According to the position between the said components, the slope of the inclined wall 20 will be adjusted to guide the ground coffee appropriately towards the center of the filter holder 6 during its transfer. An operating member different from the operating lever 17 may also be envisioned, for example a wheel. One could also envision translation means 18 different from the rack 22 and pinion 21 system, according to the position of the operating member and of the opening and closing member 16 on the machine 1.

The invention claimed is:

1. A coffee machine comprising a brewing area, a ground coffee storage reservoir arranged over the brewing area and a transfer device for transferring ground coffee from the storage reservoir towards the brewing area through an aperture, the transfer device comprising a member for opening and closing the aperture and a system for moving the member for opening and closing the aperture, the member being able to move between an open position and a closed position, wherein the member comprises an open part which has an inclined wall configured, when in the open position, to be positioned below the aperture and to direct towards the brewing area the ground coffee that passes through the aperture, and to be offset from the aperture when in the closed position, wherein the transfer device comprises a member for cleaning the inclined wall when the member for opening and closing the aperture moves from the open position to the closed position, and vice versa, and wherein the cleaning member comprises a vertical wall cooperating with the inclined wall to clean it.

2. The coffee machine according to claim 1, wherein the inclined wall is configured to direct the ground coffee towards a center of the brewing area.

3. The coffee machine according to claim 1, wherein the system for moving the member comprises a translation system configured to perform translational movement of the member for opening and closing the aperture, from the open position to the closed position, and vice versa.

4. The coffee machine according to claim 1, wherein the member for opening and closing the aperture comprises a horizontal wall which blocks the aperture in the closed position.

5. The coffee machine according to claim 1, wherein the system for moving the member comprises an operating lever for enabling movement of the member for opening and closing the aperture.

6. The coffee machine according to claim 5, wherein the operating lever is able to move between a vertical position, in which the member for opening and closing the aperture is in a closed position, and a horizontal position, in which the member for opening and closing the aperture is in an open position.

7. The coffee machine according to claim 5, wherein the transfer device comprises a rack and pinion system, the operating lever being secured to the pinion and the rack being secured to the member for opening and closing the aperture.

8. The coffee machine according to claim 1, wherein the transfer device comprises a spring to return the member for opening and closing the aperture from the open position to the closed position.

9. The coffee machine according to claim 1, wherein the transfer device comprises a disk driven in rotation by a motor, the start-up of the motor being controlled by moving the member for opening and closing the aperture into the open position.

10. The coffee machine according to claim 9, wherein the disk is driven in rotation about a vertical axis, and wherein the motor is arranged at a center of the disk with respect to this vertical axis.

11. The coffee machine according to claim 4, wherein the horizontal wall is configured to move horizontally relative to the storage reservoir via the system for moving the member.

12. The coffee machine according to claim 7, wherein the operating lever is configured to rotate between the vertical position and the horizontal position, wherein rotation of the operating lever causes movement of the pinion along the rack, resulting in translational movement of the rack and thus movement of the member for opening and closing the aperture.

13. A coffee machine comprising a brewing area, a ground coffee storage reservoir arranged over the brewing area and a transfer device for transferring ground coffee from the storage reservoir towards the brewing area through an aperture, the transfer device comprising a member for opening and closing the aperture and a system for moving the member for opening and closing the aperture, the member being able to move between an open position and a closed position, wherein the member comprises an open part which has an inclined wall configured, when in the open position, to be positioned below the aperture and to direct towards the brewing area the ground coffee that passes through the aperture, and to be offset from the aperture when in the closed position, wherein the transfer device comprises a member for cleaning the inclined wall when the member for opening and closing the aperture moves from the open position to the closed position, and vice versa, and wherein the transfer device comprises a spring to return the member for opening and closing the aperture from the open position to the closed position.

14. The coffee machine according to claim 13, wherein the inclined wall is configured to direct the ground coffee towards a center of the brewing area.

15. The coffee machine according to claim 13, wherein the system for moving the member comprises a translation system configured to perform translational movement of the member for opening and closing the aperture, from the open position to the closed position, and vice versa.

16. The coffee machine according to claim 13, wherein the system for moving the member comprises an operating lever for enabling movement of the member for opening and closing the aperture.

17. A coffee machine comprising a brewing area, a ground coffee storage reservoir arranged over the brewing area and a transfer device for transferring ground coffee from the storage reservoir towards the brewing area through an aperture, the transfer device comprising a member for opening and closing the aperture and a system for moving the member for opening and closing the aperture, the member being able to move between an open position and a closed position, wherein the member comprises an open part which has an inclined wall configured, when in the open position, to be positioned below the aperture and to direct towards the brewing area the ground coffee that passes through the aperture, and to be offset from the aperture when in the closed position, wherein the transfer device comprises a member for cleaning the inclined wall when the member for opening and closing the aperture moves from the open position to the closed position, and vice versa, and wherein the transfer device comprises a disk driven in rotation by a motor, the start-up of the motor being controlled by moving the member for opening and closing the aperture into the open position.

18. The coffee machine according to claim 17, wherein the inclined wall is configured to direct the ground coffee towards a center of the brewing area.

19. The coffee machine according to claim 17, wherein the system for moving the member comprises a translation system configured to perform translational movement of the member for opening and closing the aperture, from the open position to the closed position, and vice versa.

20. The coffee machine according to claim 17, wherein the system for moving the member comprises an operating lever for enabling movement of the member for opening and closing the aperture.

\* \* \* \* \*